June 29, 1954  W. E. SNYDER  2,682,190

TOGGLE BOLT

Filed Feb. 12, 1952

Walter E. Snyder
INVENTOR.

BY Clarence A. O'Brien
and Harvey B. Jacobson
Attorneys

Patented June 29, 1954

2,682,190

UNITED STATES PATENT OFFICE 2,682,190

TOGGLE BOLT

Walter E. Snyder, North Troy, N. Y.

Application February 12, 1952, Serial No. 271,101

3 Claims. (Cl. 85—3)

This invention relates in general to toggle bolts, and more specifically toggle bolts having wing members which are pivotally secured to the nut portion thereof.

The primary object of this invention is to provide an improved toggle bolt which includes a conventional threaded bolt having threadedly engaged thereon a nut which has pivotally secured thereto a pair of wing members, said wing members being adapted to be held to a position in substantially the same longitudinal axis as the bolt whereby the threaded end of the bolt, the nut, and the wing members may be passed through a small opening in a member in order that the bolt may be secured to said member, the rear side of the member being inaccessible.

Another object of this invention is to provide an improved toggle bolt having a nut portion which includes a threaded nut member to which is pivotally secured a pair of wing members, said wing members being adapted to be folded into substantial alignment with the bolt, the nut and wing members having tapered end portions whereby the nut and wing members may be easily pushed through a small diameter opening.

Another object of this invention is to provide an improved toggle bolt having a nut structure which includes a threaded member having wing members secured thereto for pivotal movement with respect to the threaded member, and spring means carried by said threaded member for urging the wing members into substantial alignment with the axis perpendicular to the bolt.

A further object of this invention is to provide an improved toggle bolt which includes a nut structure comprising a threaded member having pivotally secured thereto a pair of diametrically opposite wing members which are mounted on pivot pins carried by the threaded member, and spring elements mounted on each side of the threaded member and retained by the pivot pins, the spring elements having crossed arms engaging the wing members and urging them into substantial alignment.

A still further object of this invention is to provide an improved toggle bolt which includes a nut structure having a pair of diametrically opposite wing members pivotally connected thereto by pivot pins and spring elements mounted on the pivot pins in such a manner that legs thereof engage the wing members and independently urge them toward positions normal to the axis of the nut, the legs of the spring elements being so related whereby the breakage of a leg of a spring element will in no way affect the function of the other leg of such spring element.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1:
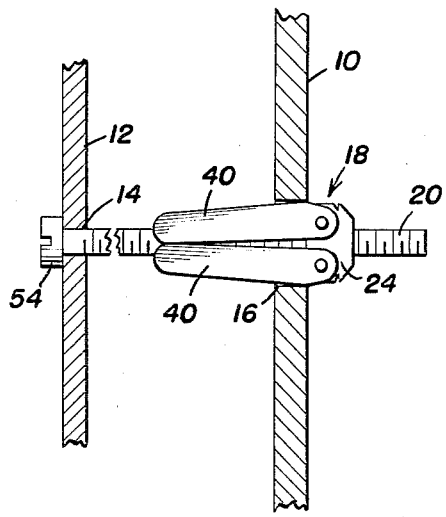
Figure 1 is a vertical sectional view through two plate members which are in the process of being joined together by the toggle bolt, which is the subject of this invention, the wing members of the toggle bolt being folded to a position substantially in alignment with the bolt and are being passed through an opening in one of the plates.
Figure 2:
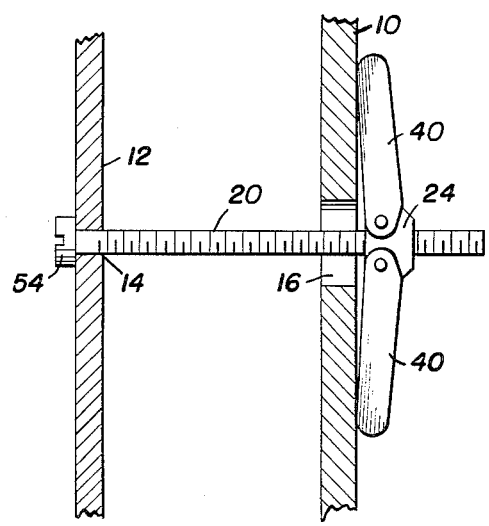
Figure 2 is a vertical sectional view similar to Figure 1, but showing the nut portion of the toggle bolt after it has been passed through the opening in one of the plate members and with the wing members engaging the rear side of the plate.
Figure 3:
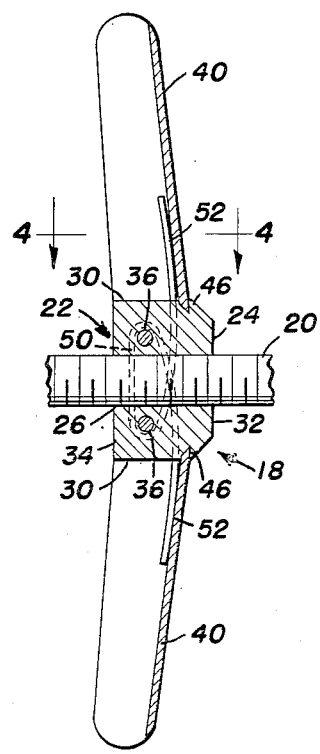
Figure 4:
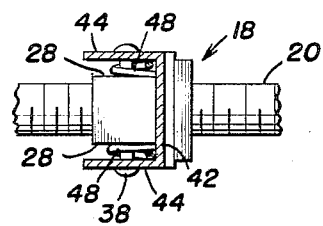

Figure 3 is an enlarged longitudinal vertical sectional view through the nut portion of the bolt of Figures 1 and 2 and showing the internal construction thereof; and, Figure 4 is a transverse horizontal sectional view taken substantially upon the plane of the line 4—4 of Figure 3 and showing the manner in which the wing members are pivotally secured to the threaded nut member and the manner in which the spring elements are secured to the threaded nut member.

Similar characters of reference designate similar or identical elements and portions through the specification and throughout the different views of the drawings.

Referring now to the drawings in detail, it will be seen as illustrated in Figure 1 a first plate member 10 to which it is desired to secure a second plate member 12. While the ends of the plate members 10 and 12 and other associated parts are not illustrated, it will be understood for the purpose of describing this invention that the rear side of the plate 10 is inaccessible.

It will be noted that the plate member 12 has a small opening 14 therein and that the plate member 10 has an enlarged opening 16 in alignment with the opening 14 of the plate member 12. When it is desired to attach the plate member 12 to the plate member 10, the inaccessibility of the rear side of the plate member 10 requires that a toggle bolt must be utilized. Illustrated in Figures 1 and 2 is the toggle bolt, which is the subject of this invention, the bolt being referred to in general by the reference numeral 18.

Referring now to Figures 3 and 4 in particular, it will be seen that the toggle bolt 18 includes a conventional threaded bolt 20 upon which is threadedly engaged a nut structure referred to in general by the reference numeral 22. The nut structure 22 includes a threaded member 24 which is rectangular in cross section and has a central threaded bore 26 with which the bolt 20 is threadedly engaged. In order to recite the relationship of the other elements of the nut structure 22 with respect to the threaded member 24, the threaded member 24 will be described as having sides 28, ends 30, a rear 32, and front 34.

The threaded member 24 has a pair of bores 36 extending therethrough and opening through the sides 28. Disposed within each of the bores 36 is a pivot pin 38. Secured to the threaded member 24 is a pair of diametrically opposite wing members 40 which are channel shaped in cross section and grooved webs 42 and side flanges 44.

Wing members 40 are mounted on the threaded member 24 with the ends 30 thereof telescoped within the wing members and the flanges 44 of the wing members being in spaced parallel relation to the sides 28 of the threaded members 24. The flanges 44 of the wing members 40 are provided with apertures in which are received the pivot pins 38, and the pivot pins have their ends rounded over to form heads which retain the flanges 44 thereon.

As is best illustrated in Figures 1 and 2, the inner ends of the wing members 40 are tapered and of a reduced thickness with a portion of the web 42 of each of the wing members 40 being removed adjacent the end thereof. The ends are tapered to facilitate the movement of the wing members 40 through the opening 16 of the plate member 10 and the end portion of the webs 42 have been removed to permit the wing members 40 to be pivoted to a position which is substantially normal to the axis of the bolt 20. In order that the wing members 40 may not be rotated past the position shown in Figure 3, the ends 30 of the threaded member 24 are provided with aligned grooves 46 in which are received the inner ends of the webs 42 of the wing members 40. It is readily apparent that when the ends of the webs 42 engage in the grooves 46 that further rotation of the wing members 40 is prevented.

In order that the wing members 40 be urged into a position shown in Figure 3, the nut structure 18 is provided with a pair of identical spring elements 48. The spring elements 48 each includes a closed looped portion 50 and a pair of crossed legs 52 extending in the opposite directions therefrom. It will be noted that each of the spring elements 48 is mounted with its loop portion 50 enclosing the pivot pins 38 and have their leg portions 52 underlying the webs 42 of the wing members 40 and engaging them into the position illustrated in Figure 3. It should also be noted that the individual spring elements 48 are mounted on opposite sides of the threaded member 24 and between the sides 28 thereof and the inner surfaces of the flanges 44 of the wing members 40.

In order that the nut structure 22 may be inserted through the opening 16 of the plate member 10 with ease, the rear 32 of the threaded member 24 is tapered inwardly to form a smaller entrance area.

When it is desired to connect the plate member 12 to the plate member 10, the nut structure 22 is removed from the bolt 20 and the bolt 20 is then inserted through the opening 14 in the plate member 12. The nut structure 22 is then threaded back on to the bolt 20 and the wing members folded to the position shown in Figure 1. The end of the bolt 20 and the nut structure 22 is then pushed through the opening 16 in the plate member 10 until the extreme ends of the wing members 40 are on the rear side of the plate member 10. When the extreme ends of the wing members 40 have cleared the opening 16, they are urged away from the bolt 20 by the spring elements 48 and assume the position as illustrated in Figure 2. Inasmuch as each of the spring elements 48 has its loop portion 50 fixedly retained by the pivot pins 36, the individual legs 52 will function even though a leg 52 of a spring element 48 may break. This will insure the securement of the bolt 20 even if breakage of a spring leg 52 occurs during the positioning of the nut structure 22.

The bolt 20 is provided with a conventional head of any type, although there has been illustrated a slotted head 54. The bolt is then screwed through the threaded member 24 until the plate 12 is into face to face engagement with the plate member 10 and clamped thereagainst due to the action of the bolt 20.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A toggle bolt comprising a threaded bolt member, a nut threadedly engaged on said bolt member, spaced parallel pivot pins projecting from opposite sides of said nut, a wing member pivotally mounted on each of said pivot pins, a spring element mounted at one side of said nut and retained in position by said pivot pins, said spring element having an intermediate portion and a pair of oppositely directed legs, said intermediate portion being in the form of a loop, said loop being elongated and having said pivot pins snugly received in opposite ends thereon to retain said intermediate portion against movement, each of said legs engaging one of said wing members and independently urging said wing members to positions normal to said bolt member.

2. A toggle bolt comprising a threaded bolt member, a nut threadedly engaged on said bolt member, spaced parallel pivot pins projecting from opposite sides of said nut, a wing member pivotally mounted on each of said pivot pins, a spring element mounted at one side of said nut and retained in position by said pivot pins, said spring element having an intermediate portion and a pair of oppositely directed legs, said intermediate portion being in the form of a loop, said loop being elongated and having said pivot pins snugly received in opposite ends thereon to retain said intermediate portion against movement, each of said legs engaging one of said wing members and independently urging said wing members to positions normal to said bolt member, said nut having narrow grooves on opposite ends thereof, said wing members having shoulder portions movable into locking engagement with said nut within said grooves to limit pivoting of said wing members.

3. A toggle bolt comprising a threaded bolt member, a nut threadedly engaged on said bolt member, spaced parallel pivot pins projecting from opposite sides of said nut, a wing member pivotally mounted on each of said pivot pins, a spring element mounted at one side of said nut and retained in position by said pivot pins, said spring element having an intermediate portion and a pair of oppositely directed legs, said intermediate portion being in the form of a loop, said loop being elongated and having said pivot pins snugly received in opposite ends thereon to retain said intermediate portion against movement, each of said legs engaging one of said wing members and independently urging said wing members to positions normal to said bolt member, and a second spring element, said second spring element being identical with said first mentioned spring element and being secured to an opposite side of said nut by said pivot pins, said second spring element having legs engaging said wing members and cooperaitng with the legs of said first mentioned spring element.

References Cited in the file of this patent

UNITED STATES PATENTS

| Number | Name | Date |
|---|---|---|
| 1,228,512 | Zifferer | June 5, 1917 |
| 1,301,558 | Gregec | Apr. 22, 1919 |
| 1,396,278 | Paine et al. | Nov. 8, 1921 |
| 1,600,034 | Brenizer | Sept. 14, 1926 |
| 1,600,035 | Brenizer | Sept. 14, 1926 |
| 1,956,623 | Pleister | May 1, 1934 |
| 2,061,634 | Pleister | Nov. 24, 1936 |